United States Patent
Sharma

(10) Patent No.: US 9,934,099 B1
(45) Date of Patent: Apr. 3, 2018

(54) DYNAMICALLY PAUSING LARGE BACKUPS

(71) Applicant: EMC IP Holding Company LLC, Hopkinton, MA (US)

(72) Inventor: Anupam Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 14/290,632

(22) Filed: May 29, 2014

(51) Int. Cl.
G06F 17/30 (2006.01)
G06F 11/14 (2006.01)

(52) U.S. Cl.
CPC .............. G06F 11/1446 (2013.01)

(58) Field of Classification Search
USPC .................................. 707/609, 640
See application file for complete search history.

(56) References Cited

U.S. PATENT DOCUMENTS

| | | | | |
|---|---|---|---|---|
| 5,758,359 A * | 5/1998 | Saxon | ............... | G06F 11/1461 707/644 |
| 2007/0198722 A1* | 8/2007 | Kottomtharayil | ....... | H04L 12/66 709/226 |
| 2009/0313503 A1* | 12/2009 | Atluri | ............... | G06F 11/1453 714/19 |
| 2013/0058269 A1* | 3/2013 | Xia | .................. | H04W 52/0206 370/311 |
| 2014/0071290 A1* | 3/2014 | Collen | .................... | H04N 9/79 348/159 |
| 2014/0092757 A1* | 4/2014 | Xu | ....................... | G06F 11/349 370/252 |
| 2015/0193312 A1* | 7/2015 | Nanivadekar | ....... | G06F 11/1458 707/654 |
| 2015/0199367 A1* | 7/2015 | Hammer | .......... | G06F 17/30085 707/654 |
| 2015/0370645 A1* | 12/2015 | Dhanalakoti | ....... | G06F 11/1451 707/646 |

* cited by examiner

*Primary Examiner* — Kim Nguyen
(74) *Attorney, Agent, or Firm* — Van Pelt, Yi & James LLP

(57) ABSTRACT

It is determined that a backup of a set of backup sources is triggered at a first instance by a backup policy associated with the set of backup sources. It is determined for each backup source of the set of backup sources, a size of data to be backed up. In the event the determined size of a selected backup source of the set exceeds a threshold size, a backup of the selected backup source is paused despite the backup policy specifying the backup to be performed at the first instance and the backup of the selected backup source is resumed at a second instance specified by a backup resume policy.

18 Claims, 4 Drawing Sheets

DYNAMICALLY PAUSING LARGE BACKUPS

BACKGROUND OF THE INVENTION

Data backup environments usually include multiple backup sources that are to be backed up. Often backups are configured using one or more backup policies that specify when to perform a backup of a group of one or more backup sources. However, it may take a variable amount of time to backup each of the backup sources because the backup sources may contain varying amounts of data and variable amounts of incremental data that have been modified since a previous backup. Often due to resource and program constraints, when a large amount of data is being backed up from a single backup source, other backup sources are waiting for the single backup source to finish before the other backup sources are backed up. This may cause a backup of a backup source to be delayed beyond an acceptable amount of time after the backup was initiated by the backup policy. Therefore, there exists a need for a better way to handle a backup that may take a long time to complete.

BRIEF DESCRIPTION OF THE DRAWINGS

Various embodiments of the invention are disclosed in the following detailed description and the accompanying drawings.

DETAILED DESCRIPTION

Figure 1:
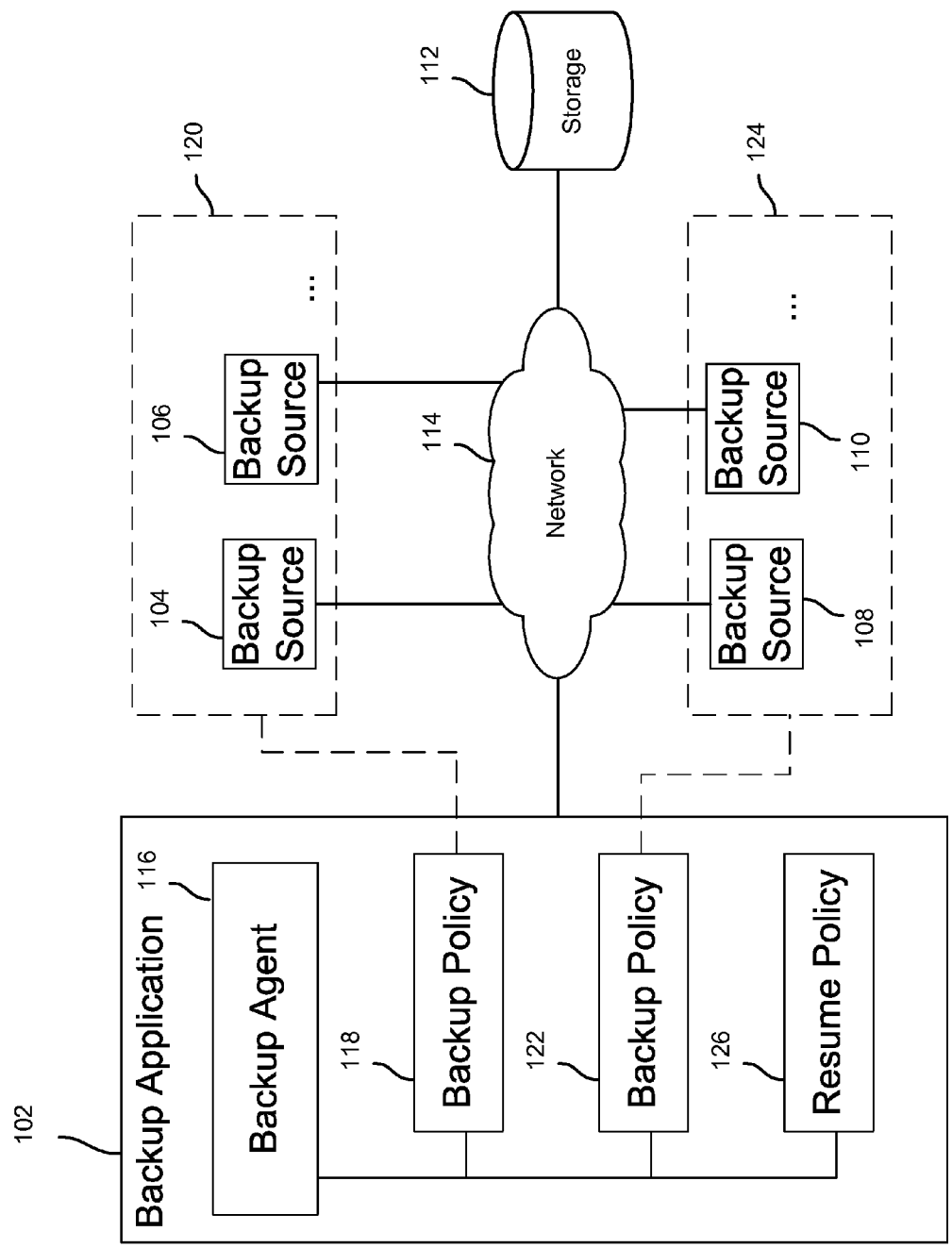
FIG. 1 is a block diagram illustrating a backup environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Backing up backup sources is disclosed. In some embodiments, backups of a set of backup sources are initiated at an initial instance triggered by a backup policy specific to the set of backup sources. For example, the backup policy specifies a criteria for when to perform a backup of a group of backup sources and it is determined that the criteria is met. A size of data to be backed up for each backup source of the set of backup sources is determined. For example, the amount of incremental data to be backed up due to changes since a previous backup is determined. In the event the determined size of a selected backup source of the set exceeds a threshold size, a backup of the selected backup source is paused despite the backup policy specifying the backup to be performed at the initial instance, and the backup of the selected backup source is resumed at a resume instance triggered by a resume policy. For example, if the size of data to be backed up is greater than the threshold size, it is determined that the backup of the selected backup source will likely take a long time to complete and the backup of the selected backup source should be performed at a later time to avoid allowing the backup of the selected backup source to prevent timely backup of other backup sources. The backup of the selected backup source is resumed when the resume policy triggers the backup resume (e.g., triggered when resource utilization is low, triggered overnight, etc.).

FIG. 1 is a block diagram illustrating a backup environment. Backup application 102, backup source 104, backup source 106, backup source 108, backup source 110, and storage 112 are connected together via network 114. Backup application 102 manages backup agent 116. An example of backup agent 116 includes a process of backup application 102 that initiates a backup. Backup application 102 may be hosted/executed on a server, a backup server, a control server, a central server, or any other system that manages a backup of a backup source data. Examples of backup source 104, 106, 108 and 110 include one or more of the following: a client, a virtual machine, a backup data stream, a user system, a mobile device, and any other computer or data storage. Examples of storage 112 include a network attached storage, a backup storage, a storage system, a backup media, and any other form of storage connected to a network. Backup agent 116 manages backing up of one or more associated backups according to backup policy 118 and backup policy 122. For example, each backup policy specifies which backup source(s) to backup, which portion of the backup source to backup, when to perform a backup, how often to perform the backup, a triggering condition for a backup, a backup storage target, a type of backup to be performed, whether to perform a full or incremental backup, etc. In the example of FIG. 1, backup policy 118 specifies a backup policy for group 120 of backup sources including backup sources 104 and 106 and backup policy 122 specifies a backup policy for group 124 of backup sources including backup sources 108 and 110. For example, backup policy 118 controls the backup timing (e.g., backup once a day at noon) of group 120 of backup sources and backup policy 122 controls backup timing of group 124. When a backup of a backup source shown in FIG. 1 is performed, the backup data may be stored in storage 112, storage of one or more backup sources, and/or storage of a system of backup application 102. When a backup of a backup source is initiated by backup agent 116 using a backup policy, the backup may be performed by backup agent 116, another backup agent of backup application 102, an application/process of the backup source, and/or a remote backup system/device (e.g., system of storage 112).

In some embodiments, backup agent 116 serially initiates backup specified by backup policies. For example, a backup agent only processes a single backup policy at one time, which requires that backups of all backup sources of one backup policy finish before backups backup sources of another backup policy are initiated. When processing a backup policy, a backup agent may process each backup source of a backup policy serially. For example, a backup agent only processes a single backup source at one time, which requires completion of a backup of a currently processing backup source before a backup of another backup source is initiated. The serial processing nature of the backup policy associated backup sources may be due to process, program, and/or resource limitations. Due to this serial nature of backup processing, if a backup of a single backup source is taking a long time to complete, backup of other backup resources may be unacceptably stalled. For example, a backup policy may specify a desired window of when a backup of a backup resource is to be completed and this window may be missed for a large number of other backup sources of one or more backup policies. It would be more desirable to maximize the number of backup sources that meet the backup window of backup policies by stalling/pausing the backup of the single backup source taking a long time to complete.

In some embodiments, because there is a correlation between the amount of data to be backed up and amount of time required to complete a backup, when it is detected that data to be backed up exceeds a threshold size, backup of a backup source is paused to allow other backup sources with less data to be backed up. For example, when backup agent 116 determines that backup should be initiated for one or more backup sources pursuant to a backup policy, backup agent 116 determines a size of data to be backed up (e.g., determine amount of incremental change since a previous backup) for each backup source to be backed up prior to continuing a backup of the backup source. If it is detected that the size of data to be backed up exceeds the threshold size, the backup of the backup source is paused and the backup agent is allowed to initiate backup of another backup source. The list of backup sources that have been paused across one or more backup policies may be then managed by backup resume policy 126 that resumes the backups of the paused backup sources when a resume triggering condition is triggered (e.g., at a time when system utilization is known to be low, when one or more backups of other backup policies have completed, etc.). After the paused backup has been resumed and completed, a subsequent backup of the once paused backup source may be triggered by the original backup policy.

Examples of network 114 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although a single or a few instances of components have been shown to simplify the diagram, additional instances of any of the components shown in FIG. 1 may exist. For example, multiple backup agents may be managed by backup application 102, backup agent 116 may process more than two backup policies, backup policy 118 and 122 may specify backup of other backup sources not shown in FIG. 1, etc. Components not shown in FIG. 1 may also exist.

Figure 2:
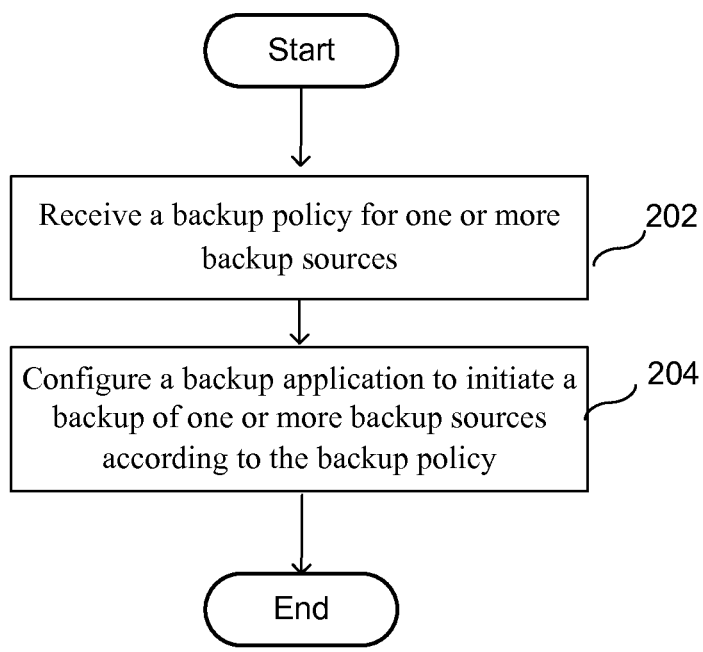
FIG. 2 is a flowchart illustrating an embodiment of a process for configuring a backup application.

FIG. 2 is a flowchart illustrating an embodiment of a process for configuring a backup application. The process of FIG. 2 may be implemented on backup application 102 of FIG. 1.

At 202, a backup policy for one or more backup sources is received. In some embodiments, receiving the backup policy includes receiving a specification of a backup policy that specifies configuration of one or more backups to be performed. For example, backup policy 118 or 122 is received. In some embodiments, the received backup policy is a policy (e.g., resume policy 126 of FIG. 1) that manages paused backups of one or more backup sources. In some embodiments, the backup policy specifies one or more of the following: which backup source(s) to backup, which portion of the backup source to backup, a backup schedule, when to perform a backup (e.g., time), how often to perform the backup, a triggering condition for a backup, a backup storage target, a type of backup to be performed, whether to perform a full or incremental backup, a threshold for pausing a backup, and any other configuration data to perform and manage a backup of a data source. In some embodiments, the backup policy is configurable to control a backup of a plurality of data sources. For example, a single backup policy applies to a plurality of data sources and a backup triggered by the single backup policy triggers backup of all of the plurality of data sources. Examples of the backup source include one or more of the following: a client, a virtual machine, a backup data stream, a user system, a mobile device, and any other computer or data storage. In some embodiments, the received backup policy is one of a plurality of backup policies. In some embodiments, the received backup policy is specified by a backup administrator.

At 204, a backup application is configured to initiate a backup of one or more backup sources according to the backup policy. For example, the backup application assigns the backup policy to a backup agent (e.g., a process of the backup application) that implements the backup policy. The backup agent may schedule the backup according to a backup schedule (e.g., time when backup should be performed) specified by the backup application and/or detect when a backup triggering condition (e.g., detect data modification) has been triggered. The backup policy may apply to a group of backup sources and the backup of each backup source of the group backup sources is initiated. For example, each backup source of the group backup sources may be backed up in parallel and/or serially as one or more backup sources of the group are completed.

Figure 3:
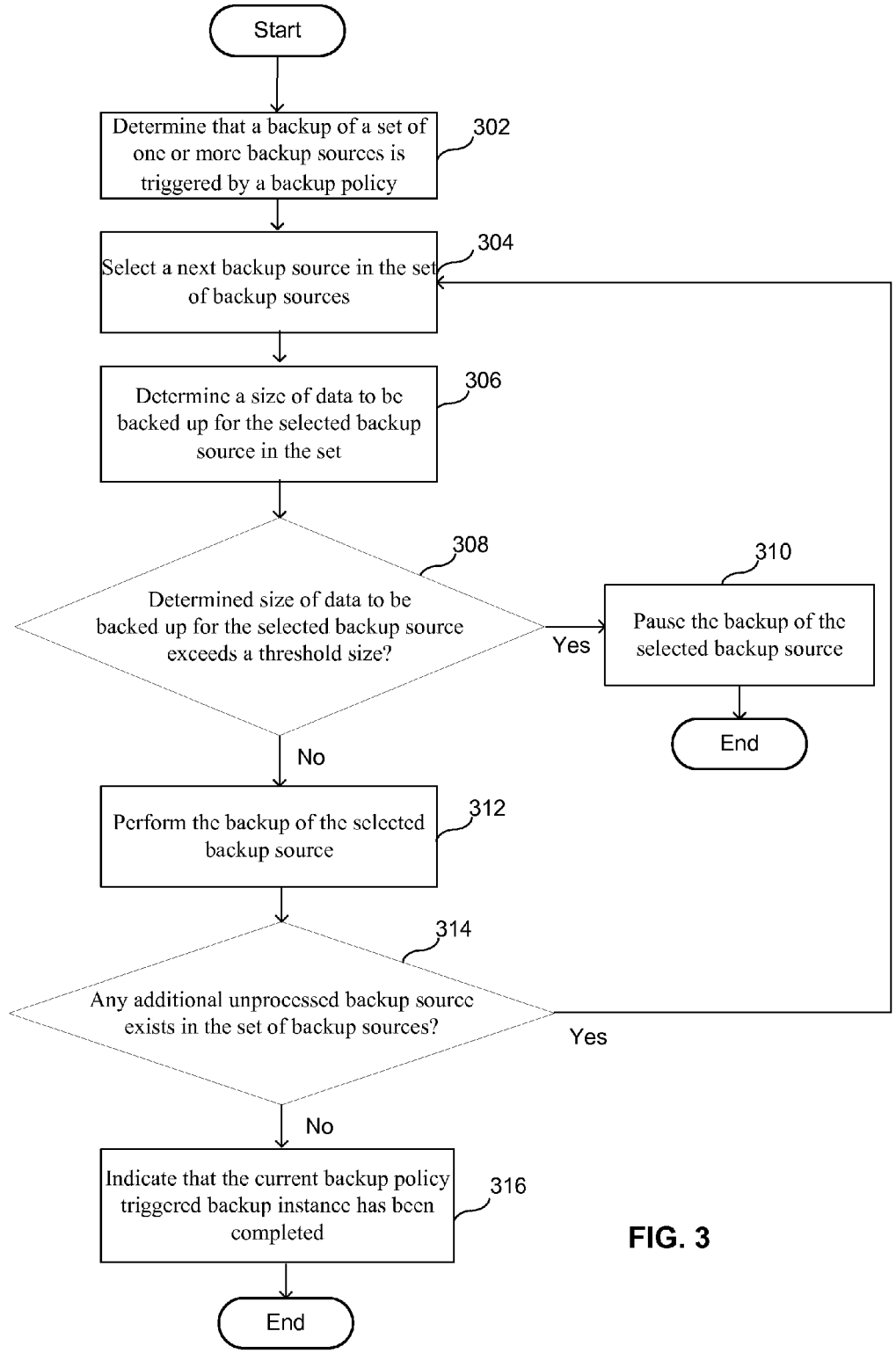
FIG. 3 is a flowchart illustrating an embodiment of a process for backing up a backup source.

FIG. 3 is a flowchart illustrating an embodiment of a process for backing up a backup source. The process of FIG. 3 may be at least in part implemented on backup application 102 of FIG. 1. In some embodiments, the process of FIG. 3 is included in 204 of FIG. 2.

At 302, it is determined that a backup of a set of one or more backup sources is triggered by a backup policy. An example of the backup policy includes the backup policy received in 202 of FIG. 2. Determining that the backup is triggered includes determining that a triggering condition to initiate the backup has been met. For example, the backup policy specifies a schedule of when one or more backups of the set of one or more backup sources should be performed and it is determined that a scheduled backup should be performed. In another example, the backup policy specifies an event, data, parameter, statistic, and/or other condition that triggers the backup of the set of one or more backup sources and it is determined that a scheduled backup should be performed due to a specified triggering condition. In some embodiments, the set of backup sources is associated with the backup policy (e.g., backup sources specified in the backup policy, a data structure linking the backup sources to the backup policy, etc.). In some embodiments, when a backup is triggered by the backup policy, backup of all backup sources of the set of backup sources is triggered. For example, each backup source of the group of backup sources is backed up in parallel. In another example, each backup source of the group of backup sources is backed up serially as one or more backup sources of the group are completed (e.g., backup a maximum of two backup sources at one time).

At 304, the next backup source in the set of backup sources is selected. For example, each backup source of the set is to be backed up and each backup source of the set is individually selected for backup (e.g., selected serially for processing).

At 306, a size of data to be backed up for the selected backup source in the set is determined. In some embodiments, determining the size includes determining a type of backup to be performed. For example, the backup policy specifies whether a full backup is to be performed or whether an incremental backup that only backs up changes since a last backup should be performed. In some embodiments, determining the size of data to be backed up includes determining an amount (e.g., data size amount, percentage, etc.) of data that has changed since a previous backup. The size of the data may be determined by analyzing a storage of the backup source and/or requesting the size of the data from the backup source. For example, a backup application (or another application/system) accesses (e.g., mounts to the storage of the selected backup source) the storage of the backup source to determine a total data size and/or compares the contents of the data storage to a previously backed up version (e.g., determines files/data created, modified, or deleted since a previous backup). In another example, the backup source analyzes its own storage to determine a total data size and/or compares the contents of the data storage to a previously backed up version to determine the size of data to be backed up and provides the results to the backup application.

At 308, it is determined whether the determined size of data to be backed up for the selected backup source exceeds a threshold size. For example, it is determined whether the data source should not be backed up because backing up the data source would take too long or consume excessive resources that would likely cause another backup to be delayed unacceptably. In some embodiments, the threshold size is specified for the backup policy and/or specified by the backup policy. The threshold size may be undefined and/or set with a value that indicates that the determined size of the data to be backed up cannot exceed the threshold size. In some embodiments, the threshold size is specified by another backup policy (e.g., backup resume policy 126 of FIG. 1) to be applied for backup sources that exceed the threshold size. The threshold size may apply to a plurality of backup policies and/or each backup policy is associated with its own threshold size. In some embodiments, the threshold size is dynamically set. For example, the threshold size is determined based on one or more of the following: resource utilization, a status of a target backup storage (e.g., storage 112 of FIG. 1), a current time, a backup policy that triggered the backup, a type of backup source, a number of backups pending, a number of backup sources in a set of backup sources of a backup policy, a length of time taken by a previous backup, a resource utilization of a previous backup, a status of a virtual machine, a status of a hypervisor, etc.

If at 308 it is determined that the determined size of data to be backed up for the selected backup source exceeds the threshold size, at 310, the backup of the selected backup source is paused. For example, backup of the selected backup source is suspended for completion at a later time. Pausing the backup may include identifying the selected backup source to be backed up according to another backup policy (e.g., resume policy). For example, an identifier of the selected backup source is added to data structure tracking all paused backups of various backup policies. In some embodiments, pausing the backup includes suspending a process/thread that is initiating the backup. In some embodiments, pausing the backup includes not indicating a backup of the selected backup source to be performed. By pausing the backup, a backup manager of a backup application may be able to initiate a backup of another backup source of the backup policy.

If at 308 it is determined that the determined size of data to be backed up for the selected backup source does not exceed the threshold size, at 312, the backup of the selected backup source is performed. In some embodiments, performing the backup includes indicating to a backup process/system and/or a system of the backup source to perform a backup of the selected backup source. For example, a backup storage system/process (e.g., backup storage 112 of FIG. 1) is instructed to perform an incremental backup (e.g., backup-specified changed data since a previous backup) of the selected backup source. In some embodiments, performing the backup includes utilizing a backup application and/or a backup application managing the backup to directly perform the backup by storing a backup of the backup source to a remote and/or local storage.

At 314, it is determined whether any additional unprocessed backup source exists in the set of backup sources of the backup policy. For example, it is determined whether for the current backup policy triggered backup instance, all backup sources of the set of backup sources have been analyzed to determine whether a backup of the backup source should be performed or paused.

If at 314 it is determined that an additional unprocessed backup source exists in the set of backup sources of the backup policy, the process returns to 304 where a new next backup source in the set of backup sources is selected for processing.

If at 314 it is determined that an additional unprocessed backup source does not exist in the set of backup sources of the backup policy, at 316 it is indicated that the current backup policy triggered backup instance has been completed. The completion indication of 316 may allow another backup of another set of one or more backup sources of another backup policy and the process of FIG. 3 is repeated using this new set of backup sources of the new backup policy. In some embodiments, the completion indication of 316 triggers a paused backup to be resumed.

Figure 4:
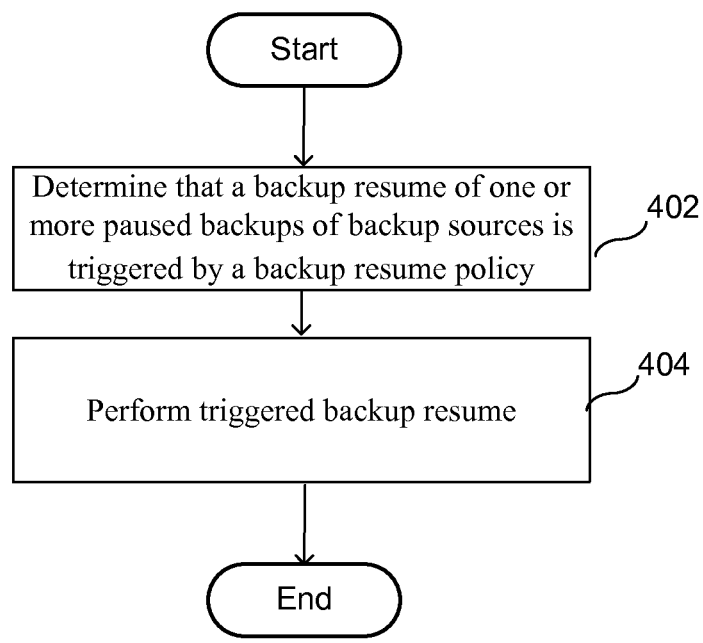
FIG. 4 is a flowchart illustrating an embodiment of a process for resuming a paused backup.

FIG. 4 is a flowchart illustrating an embodiment of a process for resuming a paused backup. The process of FIG. 4 may be at least in part implemented on backup application 102 of FIG. 1.

At 402, it is determined that a backup resume of one or more paused backups of backup sources is triggered by a backup resume policy. An example of the backup resume policy includes the backup resume policy 126 of FIG. 1. The backup resume policy may be received in 202 of FIG. 2. In some embodiments, a backup administrator specifies when paused backups should be resumed in the backup resume policy. The paused backups may be backups paused in 310 of FIG. 3. Determining that the backup resume is triggered includes determining that a triggering condition to resume a paused backup has been met. For example, the backup policy specifies a schedule of when paused backups should be resumed and it is determined that a scheduled backup resume time has been reached. In another example, the backup policy specifies an event, data, parameter, statistic, and/or other condition that triggers the backup resume and it is determined that the backup resume should be performed due to a specified triggering condition. The backup resume triggering condition may be specific to one or more backup polices, backup sources, types of backup, and/or any other backup parameter. For example, multiple backup resume policies may exist. In some embodiments, a single backup resume policy controls backup resume of all paused backups of a backup application. The backup resume policy may specify the triggering conditions, a backup location, a type of backup to be performed, and/or any other backup configuration and parameter. In some embodiments, when the backup resume is triggered by the backup resume policy, backup of all paused backups is resumed. In some embodiments, when the backup resume is triggered by the backup resume policy, only specific paused backups that meet a triggering condition are resumed.

At 404, the triggered backup resume is performed. In some embodiments, resuming and performing the backup resume includes indicating to a backup process/system and/or a system of the backup source of the paused backup to perform a backup of the selected backup source. In some embodiments, resuming and performing the backup resume includes utilizing a backup application and/or backup application managing the backup to directly perform a backup of the backup source. In some embodiments, performing the backup resume includes allowing a suspended process/thread to continue its backup. In some embodiments, the paused backups to resume may be backups triggered by different backup policies that became paused. In some embodiments, the list of paused backups to resume is obtained from a data structure storing a list of paused backups. Multiple paused backups may be resumed in parallel or serially. For example, each paused backup is resumed together. In another example, each paused backup is resumed serially as one or more backups are completed (e.g., backup a maximum of two backup sources at one time). In some embodiments, although the backup resume of a paused backup is performed according to a backup resume policy, once the paused backup is resumed and completed, a subsequent backup of the backup source of the paused backup is performed according to the original backup policy of the backup source.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  determine that a backup of a set of backup sources is triggered at a first instance by a backup policy associated with the set of backup sources;
  determine for each backup source of the set of backup sources, a size of data to be backed up; and
  in the event the determined size of data to be backed up of a selected backup source of the set exceeds a threshold size:
   pause a backup of the selected backup source that was to be performed at the first instance; and
   initiate and perform the backup of another backup source of the set based at least in part on the backup policy instead of the backup of the selected backup source, wherein the backup of the selected backup source is resumed at a second instance specified by a backup resume policy; and
  in the event the determined size of data to be backed up of the selected backup source does not exceed the threshold size, perform the backup of the selected backup source; and
 a memory coupled with the processor and configured to provide the processor with instructions.

2. The system of claim 1, wherein to perform the backup includes to provide a network indication to initiate a backup of the selected backup source.

3. The system of claim 1, wherein the set of backup sources includes a backup data stream of a networked client.

4. The system of claim 1, wherein the set of backup sources includes a virtual machine.

5. The system of claim 1, wherein the backup policy specifies a backup configuration and settings of the set of backup sources.

6. The system of claim 1, wherein the backup policy specifies a backup schedule of the set of backup sources and to determine that the backup of the set of backup sources is triggered includes to determine that it is time to perform a scheduled backup.

7. The system of claim 1, wherein the backup policy is specified by a backup administrator.

8. The system of claim 1, wherein to determine that the backup of the set of backup sources is triggered includes to determine that a data parameter of the set of backup sources meets a triggering value.

9. The system of claim 1, wherein to determine the size of data to be backed up includes to determine a type of backup to be performed.

10. The system of claim 1, wherein to determine the size of data to be backed up includes to determine a percentage of data that has changed since a previous backup.

11. The system of claim 1, wherein to determine the size of data to be backed up includes to request the size from the selected backup source.

12. The system of claim 1, wherein to determine that the size of the selected backup source of the set exceeds the threshold size includes to determine that the selected backup source would cause an unacceptable delay in backing up one or more other backup sources.

13. The system of claim 1, wherein the threshold size is a value that indicates that the determined size of the data to be backed up cannot exceed the threshold size.

14. The system of claim 1, wherein the threshold size is dynamically determined.

15. The system of claim 1, wherein to pause the backup of the selected backup source includes to suspend a backup process.

16. The system of claim 1, wherein the second instance is a time instance specified by the backup resume policy.

17. A method, comprising:

using a processor to determine that a backup of a set of backup sources is triggered at a first instance by a backup policy associated with the set of backup sources;

determining for each backup source of the set of backup sources, a size of data to be backed up; and in the event the determined size of data to be backed up of a selected backup source of the set exceeds a threshold size:
- pausing a backup of the selected backup source that was to be performed at the first instance; and
- initiating and performing the backup of another backup source of the set based at least in part on the backup policy instead of the backup of the selected backup source, wherein the backup of the selected backup source is resumed at a second instance specified by a backup resume policy; and in the event the determined size of data to be backed up of the selected backup source does not exceed the threshold size, performing the backup of the selected backup source.

18. A computer program product, the computer program product being embodied in a non-transitory computer readable storage medium and comprising computer instructions for:

determining that a backup of a set of backup sources is triggered at a first instance by a backup policy associated with the set of backup sources;

determining for each backup source of the set of backup sources, a size of data to be backed up; and in the event the determined size of data to be backed up of a selected backup source of the set exceeds a threshold size:
- pausing a backup of the selected backup source that was to be performed at the first instance; and
- initiating and performing the backup of another backup source of the set based at least in part on the backup policy instead of the backup of the selected backup source, wherein the backup of the selected backup source is resumed at a second instance specified by a backup resume policy; and in the event the determined size of data to be backed up of the selected backup source does not exceed the threshold size, performing the backup of the selected backup source.

* * * * *